United States Patent [19]  
Binzburg et al.

[11] 3,897,190  
[45] July 29, 1975

[54] PRESS TOOL FOR PRODUCING MICROCELLULAR SHAPED PIECES OF DIMENSIONAL ACCURACY, PARTICULARLY SHOE SOLES

[75] Inventors: Boris Nisonovich Binzburg; Jury Alexandrovich Smetkin; Vladimir Iosifovich Alexeenko; Vsevolod Andreevich Mikhailov, all of Moscow, U.S.S.R.; Iván Lóránt, Budapest, Hungary; Győző Seltenreich, Dunakeszi, Hungary; Jenő Kaszei, Budapest, Hungary; György Marton, Budapest, Hungary; Albert Balázsfai, Budapest, Hungary; Jenő Donáth, Budapest, Hungary; Ernő Bölcskei, Budapest, Hungary

[73] Assignees: Bőr-, Műbőr- és Cipőipari Kutató Intézet, Budapest, Hungary; Vsesojuzny Nauchno Issledovatelsky Institut Plenochnykh Materialov i Iskusstvennoi Kozhi, Moscow, U.S.S.R.

[22] Filed: Feb. 13, 1973

[21] Appl. No.: 332,089

Related U.S. Application Data

[62] Division of Ser. No. 96,738, Dec. 10, 1970, abandoned.

[30] Foreign Application Priority Data

Dec. 30, 1969 Hungary .................. BO 1210

[52] U.S. Cl. .............. 425/383; 425/406; 425/410; 264/55
[51] Int. Cl. ............................................. B29c 3/00
[58] Field of Search ............. 425/DIG. 30, 406, 383, 425/403, 410, 812; 264/55

[56] References Cited  
UNITED STATES PATENTS

| | | | |
|---|---|---|---|
| 215,633 | 5/1879 | Kinerson | 425/410 |
| 2,296,305 | 9/1942 | Roberts | 264/55 |
| 2,311,561 | 2/1943 | Miller | 425/410 X |
| 2,317,597 | 4/1943 | Ford et al. | 425/410 X |
| 2,650,390 | 9/1953 | Capdevila | 264/244 |
| 2,905,970 | 9/1959 | Wagner | 425/410 |
| 3,111,365 | 11/1963 | Hood et al. | 425/812 X |
| 3,185,752 | 5/1965 | Bingham, Jr. | 425/812 X |
| 3,208,104 | 9/1965 | Hessel | 425/812 X |
| 3,266,086 | 8/1966 | Markevilch | 425/410 X |
| 3,695,807 | 10/1972 | Sovensen et al. | 425/410 X |

Primary Examiner—Robert L. Spicer, Jr.  
Attorney, Agent, or Firm—Young & Thompson

[57] ABSTRACT

Press tools for vulcanizing plastic materials comprise a pair of mold parts defining between them a mold cavity having relatively thick and thin portions. Heat insulating inserts can be disposed adjacent the relatively thin portions (FIG. 1) to retard vulcanization of the thin portions relative to the thick portions. Hot fluid can be passed adjacent the thin and thick mold portions, the fluid adjacent the thin portions being of lower enthalpy than that adjacent the thick portions (FIG. 2). Each mold part can be formed of a pair of plates, the lower plate of each pair having upwardly opening channels closed by the upper plate of the pair (FIG. 3). A self-clicking mold can be provided by two mold plates disposed in sandwich fashion between upper and lower plates that automatically lock together upon clicking by a clicking tool that coacts with the lower mold part (FIG. 4). If hot liquid is used as the mold pressure medium, it can be introduced through a lower mold part and air evacuated through an upper mold part (FIG. 5). The mold may have a series of side wall inserts of different shapes, thereby stepwise progressively to alter the volume of the mold cavity (FIG. 6).

4 Claims, 14 Drawing Figures

PRESS TOOL FOR PRODUCING MICROCELLULAR SHAPED PIECES OF DIMENSIONAL ACCURACY, PARTICULARLY SHOE SOLES

This is a division, of application Ser. No. 96,738, filed December 10, 1970, now abandoned.

The invention comprises also tools for using in the process described above.

By the aid of the invention, it has become possible to eliminate the phenomenon of postexpansion and postshrinkage, respectively, in the case of vulcanized, microcellular product, as a result of which in the second vulcanization stage there are provided shaped pieces of high dimensional accuracy and of a low apparent density (0.2 to 0.7 g/ccm) having uniformly distributed cells, and the strength properties of which comply with every practical requirement.

A great variety of porous rubbers and plastics varying from articles with totally open intercommunicating cells to articles with fully closed cells are well known in the art. In many fields, for example, in the shoe manufacturing solely expanded rubbers with fully closed cells are of importance as only these materials meet the requirements of shoe manufacture.

The making of expanded rubbers with closed cells, commonly called microcellular rubbers by which title they will be referred to hereinafter, involves expanding. One prior art process has been to calender the relatively soft rubber mixture into a sheet or rod stock, to place this stock in an autoclave and to fill it up with a high-pressure gas (at least 200 atm.) for example, with nitrogen, whereupon a portion of said gas dissolves under the high pressure in the rubber stock, further after vulcanization to reduce the pressure by opening the mould whereupon the gas dissolved in the rubber stock expands and produces closed cells within the stock.

A more advanced process has been to add blowing agents to the crude rubber stock intended to be vulcanized in mould and heat this mixture, whereupon the blowing agents decompose the gaseous products which dissolve partly or entirely under the high pressure.

By heating the mixture this is cross-linked (vulcanized), and by opening the mould the pressure is reduced, whereupon the gaseous products expand and produce closed cells within the stock. For blocking mould parting lines the mould has been overcharged by more than 3%.

A feature in most of the above-mentioned various processes is the use of moulds with conical splits.

In the one-stage vulcanizing process the stock begins to expand when vulcanization iss terminated. A disadvantage of the process is that in practice it is difficult, if not impossible, to produce a final product, the dimensions of which — after expanding — correspond to the required dimensions. In the course of production the rubber stock grows in bulk to the multiple of its previous volume, later same goes through a shrinkage of about 3-25 % which may keep on during storage. No shaped pieces of dimensional accuracy having an apparent density less than 0.7 g/cm$^3$ may be produced by any one of these processes only less accurate ones having an apparent density of 0.7-0.9 g/cm$^3$.

In most cases two or multistage vulcanization processes are employed for producing microcellular shaped pieces which processes comprise a prevulcanization stage (temporary cross-linking) and one or more subsequent vulcanization stages (curing). It is in the nature of the multistage techniques that the microcellular structure produced by expansion in the relatively plastic stock during the revulcanization stage has to be stabilised by a final vulcanization.

One of the known two-stage processes of the art has been to achieve the first vulcanization stage in mould and to perform the second, or subsequent stages in or outside the mould. In this way there may be obtained microcellular sheets or shaped pieces of apparent density of 0.3-0.7 g/cm$^3$. Although the extent of shrinkage of these products is less than that of shaped pieces made by the one-stage process, as the extent of the strains arising during expansion is also less, it is a disadvantage of this method that it is difficult, if not impossible, to ensure a dimensional accuracy to the shaped pieces as the extent of the contraction cannot be controlled.

A known two-stage method has been to add blowing agents which decompose at a higher temperature than the vulcanization temperature to the rubber stock, and in the first stage to vulcanize the stock 15 minutes at a temperature of 110°C whereupon the stock grows in bulk to the manifold of its original volume, then to cure the intermediate product obtained in a closed mould in the usual way.

Since the first vulcanization stage is carried out free, without applying pressure a disadvantage of this method is that the cells of the final product are large-sized, that is to say, the product has no microcellular structure hence it follows that its strength properties are worse than the properties of products having a microcellular structure. By means of this method no shaped piece of good quality and of dimensional accuracy having embossed pattern and the dimensions of the parts of which varies from place to place within same piece may be produced.

Another prior art process has been to employ press mould including plungers built into the mould, to fill up completely the mould with the stock and to vulcanize the stock under a determined specific pressure in the usual way and not to open the mould after the prevulcanization is complete but to release the plunger which is pressed upwards by the pressure of the gasto a determined extent which is the intended height of the shaped piece, hence it follows that the stock expands only in one direction. The complete vulcanization is achieved at a temperature equal to the prevulcanization temperature.

It is a disadvantage of this process that the stock expands only in one direction and owing to this fact there may be obtained only such shaped pieces of inhomogeneous structure, in which the thick walled cells of various sizes are unevenly dispersed. Neither this process allows of producing embossed shaped pieces of low apparent density and of dimensional accuracy and the thickness of parts of which varies within same shape.

Present-day known press tools have many inherent deficiencies, for example a disadvantage of all known press tools is that heating up can be achieved only by the aid of heated plates, this layout partly adversely increases heating time cycles, partly does not provide uniform cross-linking in the stock if its parts are of various thickness, further owing to the great thermal energy loss this layout is uneconomical.

It is an object of the present invention to provide an efficient press tool for producing microcellular shaped pieces of dimensional accuracy and of low apparent density (less than 0.7 g/cm³) in any form and embossed with any pattern at will and the thickness of which varies within same piece and the cells of which are of the same size, and having high strength properties and complying with standard specifications and not shrinking during storage and which are suited to be fastened by vulcanization to other shaped parts, e.g. to shoe upper parts.

The invention comprises a press tool for performing a process for the manufacture of microcellular shaped pieces described above which comprises compounding a stock containing an elastomer, a plastomer the melting temperature of which is equal to or less than the temperature of the first vulcanization stage, and/or a thermoplastic elastomer, a blowing agent, the decomposition temperature of which in the particular stock is equal to or less than the temperature of the first vulcanization stage, an accelerator system which induces fast cross-linking in the first vulcanization stage and together with the vulcanization temperature and vulcanization time provides a minimum rate of vulcanization in the 20–70 % cross-linking range, and usual compounding ingredients used in the rubber industry, e.g. plasticizers and fillers; further vulcanizing and partially cross-linking said stock in a closed mould under pressure at a temperature and for a time determined by the accelerator system, in the first vulcanization stage, expanding the prevulcanized stock then completely vulcanizing the prevulcanized, expanded semi-product, cut to measures in particular cases, in a closed mould the form and dimensions of which are equal to the form and dimensions of the final product under pressure and at temperature determined by the composition of the stock in question in the second and/or subsequent vulcanization stages; further cooling the completely vulcanized product under pressure in a closed mould thereby hardening the plastomer component and stabilizing the final product in a form which corresponds to the form of the closed mould in the final vulcanization stage.

In certain cases it is expedient to modify the volume of the press tool between the first and second vulcanization stage.

A characteristic feature of the invention is that the pressure required to prevulcanization of the crude stock is provided in the closed mould the form and dimensions of which are equal to the form and dimensions of the final product by the pressure of a liquid conducted into said mould where said liquid surrounds the stock to be vulcanized, further that the expanding of the prevulcanized stock is achieved through reducing the pressure by way of discharging said liquid whereby the prevulcanized stock fills completely in the closed mould, further that the prevulcanized stock is vulcanized completely in the second vulcanization stage.

According to the present invention for pressing medium hot liquid is used in the prevulcanization stage whereby both the pressure and the temperature required to the vulcanization are simultaneously provided.

Another characteristic feature of the invention is that the shaped piece, for example shoe sole, cross-linked to some extent in the first vulcanization stage, is simultaneously attached by way of a second and/or subsequent vulcanization stages to another shaped piece or pieces made of some structural material, for example: metal, plastics, rubber, leather, for example to shoe upper part. This attaching may be carried out by spreading thermoplastic cement over the recepting pieces and joining up the cemented piece to the prevulcanized shaped piece and stabilizing this bond by a second vulcanization stage. Choice of a suitable adhesive is, of course, dependent on the particular material in question.

The means for performing the process of this invention has many advantages which other known processes of the art do not dispose of.

By the aid of the means for performing the process of present invention it has become possible for the first time to eliminate the phenomenon of postexpansion respectively postshrinkage in the production of vulcanized microcellular products, as a result of which in the second vulcanization stage there are provided shaped pieces of high dimensional accuracy and of a desirable low apparent density (0.2–0.7 g/cm³) having uniformly distributed cells and the strength properties of which comply with every requirement of the practice. Those shaped pieces may be attached by vulcanization to other structural pieces, for example shoe soles to shoe upper parts, but as a matter of course these microcellular shaped pieces of various cnfiguration may be attached also to structural pieces made of metal, plastics, etc. There is no loss of material when processing, as the cutting waste left over in the clicking procedure which follows the first vulcanization stage may be reprocessed. The moulds suitable for use in the practice of this invention are constructionally simple, not too expensive, and are easily handled.

The invention will be more clearly understood by reference to following Examples which are pure illustrative. Table 1. illustrates some suitable crude stock mixtures.

Table No. 1.

| Constituents | Formulation of compounds (Parts by weight) | | | |
|---|---|---|---|---|
| | 1 | 2 | 3 | 4 |
| Elastomer: | | | | |
| natural rubber | 20:0 | 20:0 | 40:0 | 25:0 |
| synthetic rubber (styrene-butadiene rubber) | 40:0 | 40:0 | 24:0 | — |
| Plastomer: | | | | |
| polyethylene | 20:0 | 30:0 | 20:0 | 75:0 |
| Rubber resin: | | | | |
| Butakon S 8551 | 20:0 | 10:0 | 16:0 | — |
| Expanding agent: | | | | |
| dinitroso-pentamethylene-tetraamin | 3:7 | 4:0 | 3:0 | 3:0 |
| Accelerator system | | | | |
| mercaptobenzothiazole (Captax) | 1:4 | 1:4 | 1:4 | 1:4 |
| diphenyl-guanidine (Denax) | 0:7 | 0:7 | 0:7 | 0:7 |
| Sulfur | 2:7 | 2:7 | 2:7 | 2:7 |
| Usual rubber ingredients (filler, plasticizer, etc.) | 50:0 | 50:0 | 50:0 | 20:0 |

The choice of materials for compounding is not, of course, confined to materials enumerated in Table 1., all those materials may be eligible which comply with the stipulations referred to above, that is to say: accelerator systems which induce fast cross-linking — as a function of time and temperature — in the first vulcanization stage and provide a minimum rate of vulcanization in the 20–70 % cross-linking range; blowing agents the decomposition temperature of which in the particular stock is equal to or less than the temperature of the first vulcaniztion stage; plastomers the melting temperature of which is equal to or less than the temperature of the first vulcanization stage. In this way for elastomer instead of synthetic styrene-butadiene rubber following may be employed: acrylnitrile rubber, polychloroprene, polybutadiene, polyisoprene, etc. For plastomer, for example, polystyrene or PVC may be used instead of polyethylene. The plastomer-elastomer mixture may be substituted by or mixed with all other thermoplastic elastomers. For rubber resin instead of "Butakon S 8551" of high styrene content indicated in Table 1 other rubber resins may be considered. For blowing agent in place of the indicated dinitroso-pentamethylenetetramine also azodicarbonamide or benzenesulphydrazine, etc. may be employed. For accelerator system as a rule guanidine derivatives and amine accelerators, benzthiazole derivatives or all these jointly may be used. Further examples are disclosed in U.S. Pat. No. 3,003,192.

The components of the stock partly exert an influence over the properties of the final product partly determine to a certain extent the parameters of the vulcanization time, temperature and pressure, accordingly the choice may range between wide limits depending both on the materials applied and the mixing ratio further on the parameters of vulcanization. Table 2. indicates the vulcanization parameters relating to mixtures indicated in Table 1. and mixtures No. 5, 6, containing cuttings too, further some of the strength properties characteristic of the final product. In respect of basic materials mixtures No. 5., 6. correspond to mixtures No. 1–4.

After mixing of the stock is complete- for example achieved according to formulae indicated above and by usual rubber techniques, it is expedient to perform the preceeding mixing-up of the elastomer and the plastomer at the melting temperature of the thermoplast — the stock is calandered on a profile calander or extruded through a profile orifice to sheets. This procedure is followed by the first stage of vulcanization. After vulcanization it is required that the degree of cross-linking of the intermediate product be minimal and of the same value in all parts of various thickness. Only observance of this condition provides a suitable reshapeability, a uniform microcellular structure and the reprocessability of the cuttings. Therefore the first vulcanization stage has to be achieved at the lowest temperature possible. This procedure occurs in closed space, expediently in closed mould under pressure that is higher than 2 kg/cm$^2$ preferably under a plunger pressure of, for example 40–60 kg/cm$^2$ and in case of mixtures indicated in Table 1. at a temperature of 60°–160°C, preferably at 120°–135°C. The closed mould must provide a uniform heating up of the same extent in every part of the crude shaped piece. It is inexpedient to exceed the temperature of 145°C, in the first vulcanization stage — considering the postulate relating to vulcanizing at a minimum of temperature. The length of time of the prevulcanization stage is 5–35 minutes, preferably 10–20 minutes (see Table 2.) depending on the applied vulcanization temperature. In this stage the stock becomes only partially cross-linked while the blowing agent completely decomposes to gas- Table No. 2

| Parameters of Vulcanization and indices of strength properties | Unit | Stock (no cuttings) | | | | Stock Containing Cuttings | |
|---|---|---|---|---|---|---|---|
| | | 1 | 2 | 3 | 4 | 5 | 6 |
| Time of cross-linking of the first vulcanization stage | minute | 10 | 10 | 10 | 10 | 10 | 20 |
| Temperature of cross-linking of the first vulcanization stage | °C | 130 | 130 | 130 | 130 | 130 | 120 |
| Time of cross-linking of the second vulcanization stage (after vulcanization) | minute | 10 | 10 | 10 | 10 | 10 | 10 |
| Temperature of cross-linking of the second vulcanization stage (after vulcanization) | °C | 160 | 160 | 160 | 160 | 160 | 160 |
| Tensile strength before aging | kp/cm$^2$ | 38 | 46 | 40 | — | 38 | 39 |
| Tensile strength after aging | kp/cm$^2$ | 46 | 39 | 36 | — | 34 | 38 |
| Elongation at break before aging | % | 225 | 312 | 255 | — | 284 | 327 |
| Elongation at break after aging | % | 245 | 208 | 223 | — | 256 | 270 |
| Permanent elongation (at elongation of 30 %) | % | 4:5 | 3:0 | 4:0 | — | 4:0 | 4:0 |
| Permanent deformation (under pressure/2 h, 50%, 25°C) | % | 5:8 | 4:7 | 5:4 | — | 4:5 | 4:8 |
| Tear propagation | kp/cm | 6:7 | 6:2 | 6:5 | — | 5:4 | 4:9 |
| Softness | — | 76 | 78 | 75 | — | 70 | 83 |
| Shrinkage at 25°C after 100 days | % | 0:5 | 0:5 | 0:5 | — | 0:5 | 0:5 |
| Shrinkage at 70°C in 8 hours | % | 2:7 | 2:3 | 2:3 | — | 2:2 | 2:5 |
| Apparent density | g/cm$^3$ | 0:4 | 0:39 | 0:4 | — | 0:38 | 0:4 |
| Bending strength | kilocycles | 25 | more than 25 | | | 25 | 25 | eous products. The prevulcanized intermediate products are expanded free or in the mould itself.

After this procedure the prevulcanized expanded intermediate product gets into the second stage of vulcanization where it is put into a mould the form and dimensions of which are equal to the form and dimensions of the final product, and where the cross-linking of the stock is completed — in the case of mixtures according to Table 1. This procedure is carried out in 5–10 minutes under a pressure of 5–35 kg/cm$^2$, preferably of 20 kg/cm$^2$, at a temperature that is higher than the prevulcanization temperature, at about 120°–200°C, preferably at 160°C. The parameters of pressure, temperature and time — as corresponding parameters — of the first vulcanization stage may of course come up to different values in case of other mixtures.

At the end of the second vulcanization stage prior to reducing pressure, that is to say, prior to opening the press tool, the vulcanized microcellular product is expediently cooled down to room temperature, the press will be opened only after cooling is complete, then the shaped piece is removed from it. The plastomer being in the stock becomes hard on the effect of cooling and stabilizes the shaped piece. The final product, the form and dimensions of which are equal in every direction to the form and dimensions of the vulcanizing interior of the press mould, undergoes no expansion, consequently no shrinkage any more. As a result of the process shaped microcellular pieces of dimensional accuracy and of low apparent density may be obtained. Namely the developed gas products expand the prevulcanized stock and the second vulcanization stage, to which the high temperature and pressure required to develop final shape is at the same time provided by way of the simultaneously expanding gas, stabilizes the expanded structure. In the cooling stage the gas pressure in the cells decreases and the thermoplastic components (plastomers) strengthen and, stabilize the cell walls. As a result of it no subsequent dimensional change in the shaped microcellular piece will any longer take place and the piece retains its shape, for example, like plaster casting.

Further advantages of the present invention are that — owing to the technique described above — any embossed pattern may be accomplished on the surface of the shaped piece simultaneously with the vulcanizing procedure and that the cuttings derived from clicking may be reused omitting the usual reclaiming process without any falling-off in quality. Clicking is carried out namely after the first vulcanization stage when the cross-linking has not yet been completed. The cuttings may be reused without further ado for basic component of the stock.

The vulcanization of the basic stock containing basically same components may be achieved very advantageously by the process described above according to which the basic stock the dimensions of which are smaller than the dimensions of the press tool cavity, is subjected to a hydraulic pressure and the induction of heat quantity required to the vulanization is achieved expediently by the pressing medium itself. For this purpose the use of highly pressurized hot water seems to be the most obvious solution. This process is achieved, among others, on the same parameters indicated above and in the same way and the indices of the product obtained in this way are of the same value.

The press tool suitable for use in the process according to the invention is illustrated in the accompanying drawings from which also further advantages of the process of the invention will appear, where FIG. 1 represents a longitudinal section of a prevulcanizing press tool with restricted thermal conduction.

FIG. 3a and 3b represent the section of the press tool, FIG. 3c and 3d represent the view of the inner side of the upper plate respectively of the lower plate.

Figure 1:
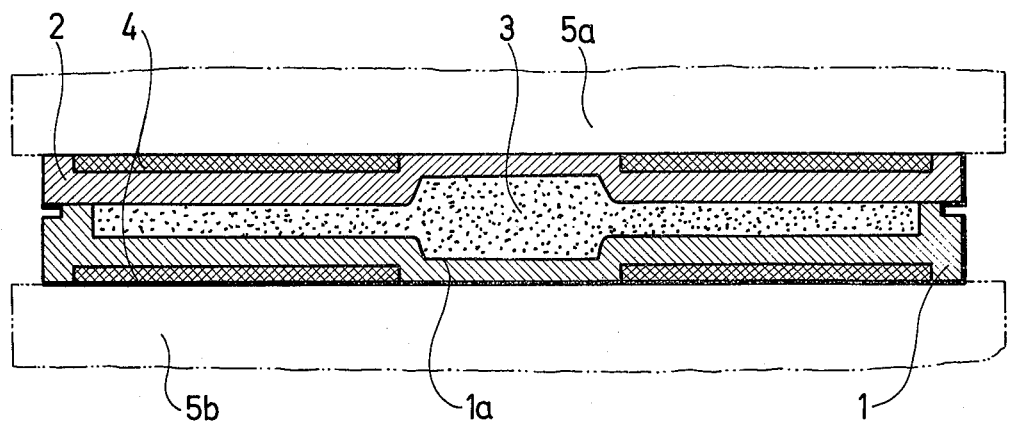

The two-piece press tool according to FIG. 1. is composed of the lower mould part 1 and of the upper mould part 2 abutting to former. Outer side sections of both upper mould part 1 and of lower mould part 2 where the thickness of the crude stock 3 is less, are covered by heat insulating insets. The heating plates of the known press non represented in the figure are denoted by reference numbers of 5a and 5b.

By the layout of the press tool of determined or limited heat conduction the vitally essential condition of the process of the invention may be ensured, vis. that every point of the stock becomes cross-linked during prevulcanization, say, in the course of the first vulcanization stage, independently of the differences in the thickness of the stock and that the degree of the vulcanization actually achieved be the same in every part of the stock. Due to the insulating insets the heat uptake of the stock is commesurate with its thickness, the various parts of the profiled sheet get various quantities of heat. Where less heat is required to there heat insulating insets are placed.

The prevulcanization using the press tool of the present invention is achieved in the following way: the crude profile stock 3 is put into the cavity of the lower mould part 1 then the upper mould part 2 is placed on the top of it and both mould parts are placed in between the heating plates 5a and 5b of the press and are pressed together, the suitably measured heat insulating insets 4 ensure that various quantities commensurate with the thickness come to the thicker or thinner parts of the stock 3. By this way the required degree of uniform prevulcanization actually achieved and a homogeneous cross-linking of the whole intermediate product which is sensitive to temperature variations, are guaranteed. The intermediate product thus obtained is remarkably suitable for starting material in the further processes of the present invention and its cuttings may be reused omitting the usual reclaiming processes.

Figure 2:
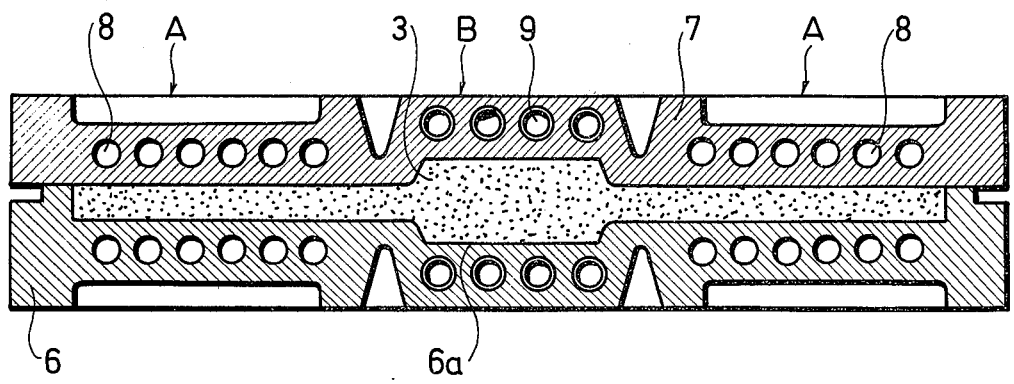
FIG. 2 represents the longitudinal section of another prevulcanizing press tool having devided temperature ranges.
Figure 3C:
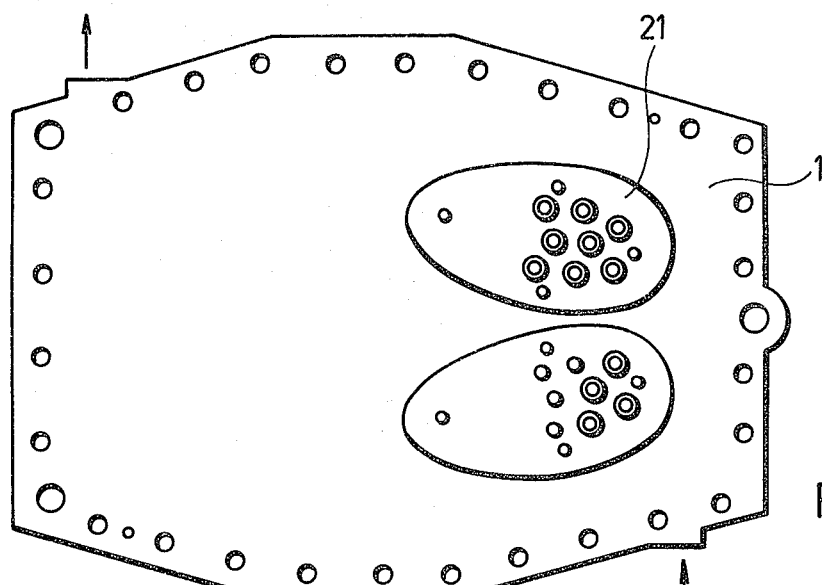
FIG. 3a–3d show an after-vulcanising pressing tool suitable both for achieving heating and cooling.
Figure 3B:
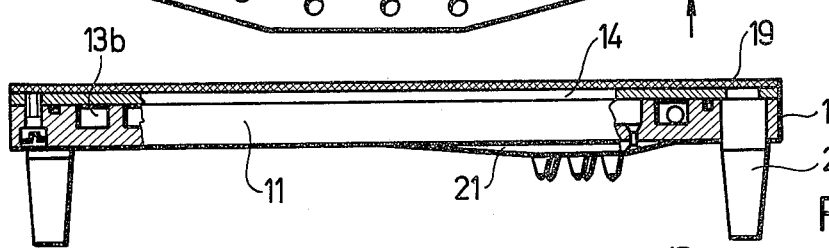
Figure 3A:
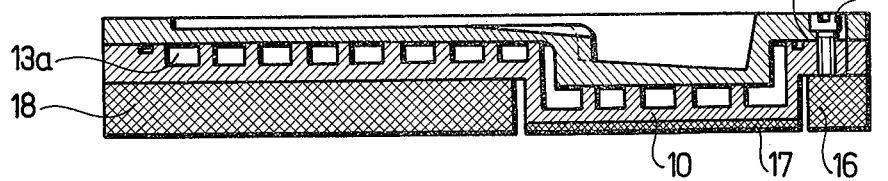
Figure 3D:
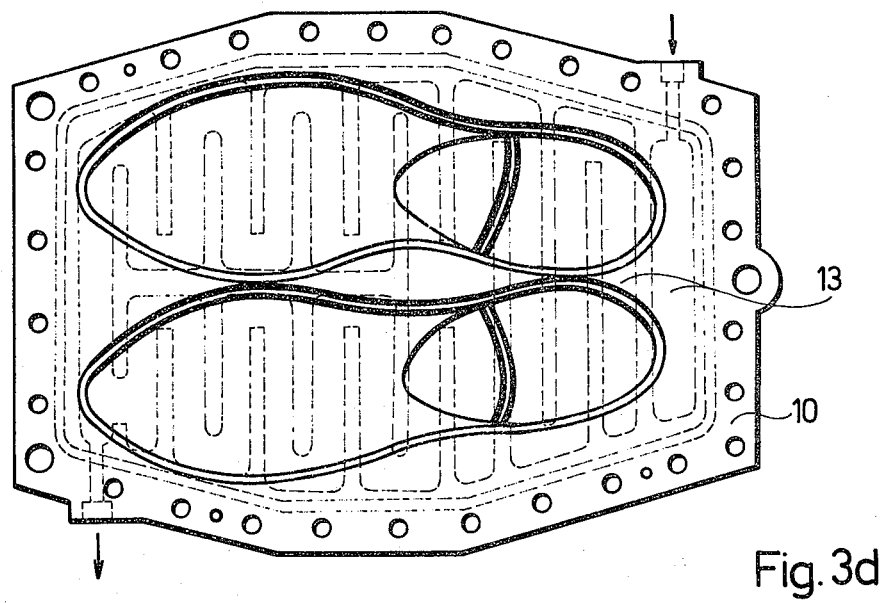

FIG. 2. represents another prevulcanizing press tool having devided temperature ranges. Its aim is also to provide a uniform cross-linking in the intermediate product. With a view to it there must be transmitted less heat to the thinner section in zones A while more heat to the thicker sections in zones B.

This procedure is achieved by steam pipe systems arranged in the press tool consisting of the die 6 and cover 7 and operated by various steam pressures. In zones A a steam pipe system consisting of 8 pipes and in zone B a steam pipe system consisting of 9 pipes are built into the die 6 and cover 7. The steam channel systems are joined by a pressure regulator — not represented in the figure — to the steam generator, by which it may be attained that various quantities of heat come to the diversely thick parts of the crude profile sheet in a determined unit of time.

The use of the press mould is to put the crude profile sheet 3 into the cavity 6a of the die 6 then to close the die by the cover 7. The press mould is set in the press and a pressure of required extent is applied on it. Steam of various pressure is admitted into the steam channel systems of zones A and B; into zones B which correspond to the thicker sections of the product there is admitted a high-pressure steam and a low-pressure steam into zones A which correspond to the thinner sections of the product. Thus admitting various quantities of heat to the thicker and thinner sections of the crude profile sheet 3 a cross-linking of the same extent is attained in the profile sheet. After prevulcanization the prevulcanized profile sheet is expanded and after having been cooled down is clicked into a suitable form and subjected to a second vulcanization stage. Since in the course of prevulcanization the cross-linking is homogeneous and only partial the cuttings deriving from clicking may be reused.

FIGS. 3a–3d represent a pressing tool suitable for carrying out the second vulcanization and then the cooling stage in confirmity with the process of present invention. The press tool has a direct heating and cooling system. The press mould consists of three main parts: the lower plate 10, the upper plate 11 and the proper press tool 12, which may be placed in between them. The wall thickness of the press tool is minimal for the sake of lightness and fast heat transfer. Its form and dimensions correspond to the form and dimensions of the product to be shaped. A bossing conforming to the embossed design to be formed on the final product may be engraved into the inner surface of the press tool 12. For paralleling the profile sheet and the press plate a separate adjusting plate may be used. Both the lower and the upper plate are fitted out with a channel system suitable for conducting the heating, respectively the cooling medium and consisting of channels 13. For an adequate insulation packings 15 are placed between the lock plate 14 to be put on the upper plate 11 just as well as between the lower plate 10 and the press tool 12. In addition the top and bottom surfaces of the press mould are covered with heat insulating plates 16, 17, 18, 19 in order to avoid warming up of the press into which the press mould, represented in FIG. 3a–3d, has been placed. The vulcanizing mould 12 is replaceable, its inner form and dimensions may be shaped in various ways and thus the press tool is suitable for manufacturing a great variety of products. The parts of the press tool are pressed together by clamping screws 20. On the lower part of the upper plate 11 there is arranged a heal block 21. The set consisting of single tool parts is steered by slightly conical pins 22.

The working process by use of the press tool described above is the following:

The clicked crude stock — not represented in the figure — is placed into the vulcanizing mould 12 and is covered by the upper plate 11. Then the press mould is put into the press and pressed together by a proper pressure.

Hot steam of a given pressure is admitted into the channels of the press tool 13, hereby providing the temperature required to the second stage of the vulcanization. On the action of heat and pressure the viscosity of the polymer mixture decreases, expands and filling in the inner space of the press mould takes on its shape while exerting pressure on the inner walls of the press mould. The product takes shape and the procedure of the development of the structure is enacted.

After the termination of the vulcanization cold water is admitted into the channels 13 in order to cool down the product. Then the press mould is opened and the final product is removed.

An advantage of the press tool described is that it is possible to accomplish both the vulcanization and the cooling of the product in the closed vulcanizing mould itself since the press must not be heated respectively cooled but only the vulcanizing mould. In this way time required so far to heat up the press together with the mould may be eliminated and the loss in heat may be reduced to a minimum for what there was no possibility in the case of presses known so far where the heating was achieved through the plates of the press. The reduction of the mass to be heated up on the press also promotes the heat loss decrease.

In order to increase the efficiency of the heating respectively cooling it is expedient to arrange several press tools in one press block and to achieve the admission of the heating, respectively cooling medium by parallel connection.

FIGS. 4a–4d represent similarly a press tool suitable for achieving the second vulcanization and the cooling stage which may be heated and cooled down independently of the press and which automatically clicks profile sheets out of the rubber stock.

Main parts of the press tool are as follows: upper plate 23, lower plate 24, press mould upper part 25a, press mould lower part 25b, and a press knife 26 tallying with the contour line of the sole and encercling it, thus suitable for achieving the clicking operation and which simultaneously close the sides of the mould. The press mould parts 25a and 25b and the press knife 26 jointly constitute the mould cavity 27 into which the intermediate product is placed.

The upper mould part 25a is fastened by adjustable screws to the upper plate 23 while the lower mould part 25b is fixed to the lower plate 24. The upper and lower mould parts are aligned with the mould cavity 27 by the aid of carrier pins 30. The space 31 serves for taking up the cuttings of the cut out intermediate product. The thickness of the profile sheet to be vulcanized may be determined by alteration of the intermediate space between the lower mould part 25a and the upper mould part 25b. The alteration is carried out by the aid of adjusting screws.

In the sleeve 35 enclosed bush 32 serves for receiving the carrier pin 30. There is a groove 33 in the central part of the carrier pin 30 while in the wall of the bush there is a ball socket 33 for receiving the ball 34 and which registers into the groove 33. These structural members jointly constitute the automatic locking device of the press tool.

The mode of operation of the self-clicking press tool in conformity with present invention is as follows:

In the starting cycle (FIG. 4b) the upper plate 23 together with the 25b upper mould part as well as the cutting knife 26 are in upper position. The profile sheet made of crude rubber mixtures 28 is placed into the mould cavity 27.

In the second cycle (FIG. 4c) the upper plate 23 together with the upper mould part 25b is slid downwards thereby pressing together the profile sheet 28.

In the third cycle (FIG. 4d) the cutting knife 26 is moved downwards and by the aid of its cutting edge a piece the form of which accurately conforms to the final form of the end-product is clicked out of the profile sheet.

In the fourth cycle 4e the cutting knife 26 is moved upwards and after lifting up the upper mould part 25b the vulcanized shaped piece 28 is taken out of the press tool.

Figure 4B:
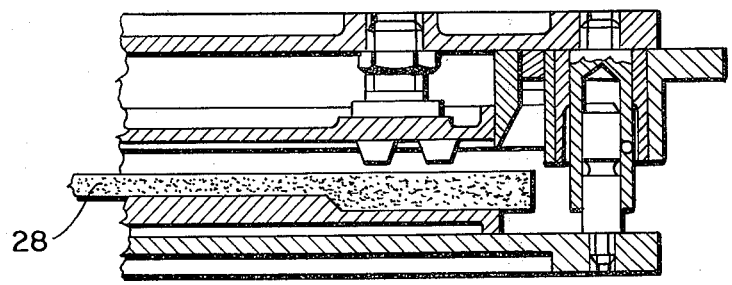
FIG. 4a–4e represent an universal hydraulic operated press tool suitable for achieving both the two vulcanization stage and the cooling.
Figure 4A:
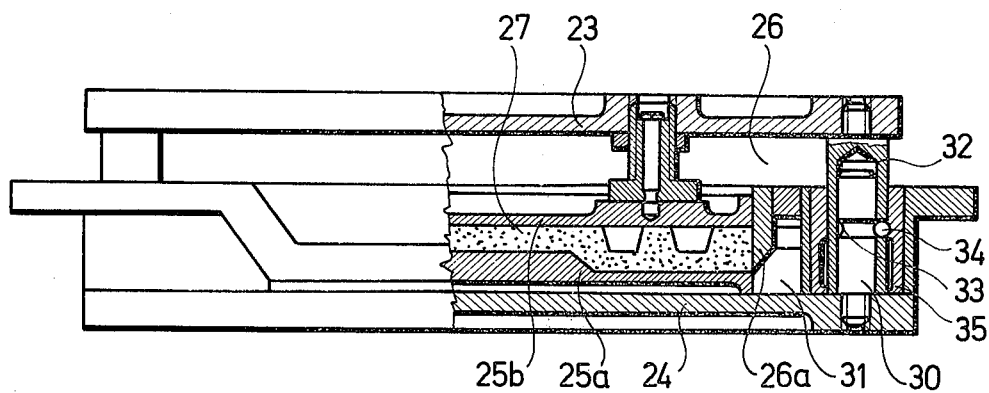
Figure 4C:
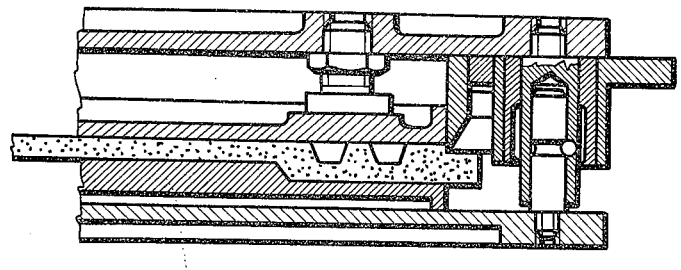
Figure 4D:
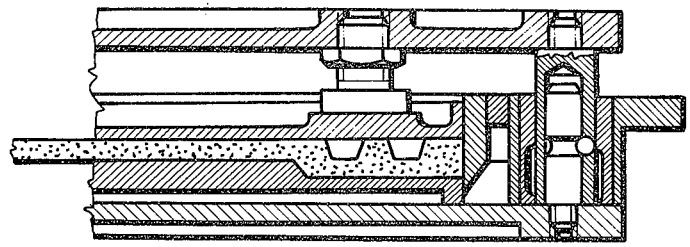
Figure 4E:
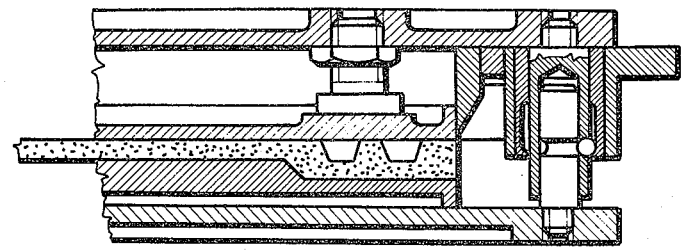

In order that the shaped piece 28 may be heated and cooled down in the closed press mould apart of the press, for example in a low-temperature cabin or in a coolant bath, and in order that the closed mould and the shaped piece therein contained may be transported for achieving this procedure, the press is fitted out with the automatic locking device described above, which comes automatically into action in the moment of clicking the locks the press tool. The mode of operation of the locking device is as follows:

(FIG. 4a and 4d). During the downward motion of the cutting knife 26 the inner surface of the sleeve 35 slides forth in the outer side wall of the bush 32 then at the end of the stroke length presses in the balls 34 into the groove 33 of the carrier pin 30; in this way in the moment of clicking the locking of the press mould is also achieved.

Figure 5A:
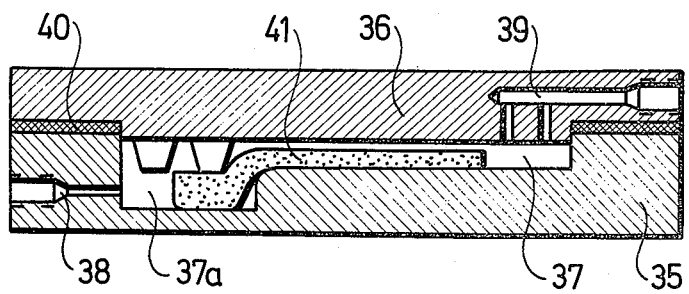
FIG. 5a–5b represent a universal press tool suitable for both prevulcanization and aftervulcanization in a single press mold.
Figure 5B:
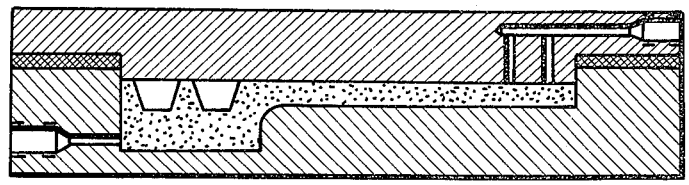

FIGS. 5a–5b represent a press tool by the aid of which the periodicity of the working operation may be eliminated, that is to say, both prevulcanization and aftervulcanization are achieved in one single press mould and not in two templates. This is very advantageous because the numerous working operations of the process carried out in two templates: change of the press tool, the placing in and taking out of the material, encumber and extend the production, provide opportunity for loosening workshop discipline and falling off in quality and productivity.

The press tool represented in FIG. 5a–5b. consists of a die 35 and a cover 36. The channel 38 formed in the body of the die 35 opens into the lower part of the shaping space 37a of the die 37 and through which a liquid employed for pressing and heat transmitting medium, for example water, may be conducted. Another channel 39 formed in the cover 36 opens into the upper part of the moulding space 37. This channel 39 serves for evacuating the air driven out by the flowing-in liquid from the moulding space 37. The channels 38, 39 are fitted out with a closing device in order that the liquid may flow out of the press tool at termination of the first stage of vulcanization. The required pressure of the liquid is provided by a pump — not represented in the figure.

The vulcanization by the aid of the press tool described above is carried out as follows:

The crude product of small volume 41 is placed into the moulding space 37 and the die 35 is closed by the cover 36. The press tool is placed on the heating plate of the press and is pressed together at required pressure by the aid of the press. Liquid (water) is conducted through the channel 38 into the moulding space 37 and after filling up the moulding space by liquid the air evacuating channel 39 is closed down, thereupon the pressure and temperature of the tool is increased to an extent required by the first stage of vulcanization.

At the end of the first stage of vulcanization the liquid is discharged from the moulding space 37 of the press mould whereupon the crude stock expands and its in every direction growing volume fills completely the moulding space 37 of the press tool which space accurately corresponds to the form of the required product (see position in conformity with FIG. 5a)

Then the second stage of vulcanization is carried out. The temperature required for this is provided by the known heatable press plate — not represented in the figure — on which the press tool is placed.

On completion of the second stage of vulcanization the press mould is cooled down and the end product is taken out of it.

As mentioned above the whole vulcanization operation has been carried out in the very same press tool and no need for additional manipulation has appeared. The hydraulic vulcanization course of processing illustrated in FIGS. 5a–5b may be developed also in the press tool illustrated in FIGS. 3a–3d which may be directly heated.

Figure 6:
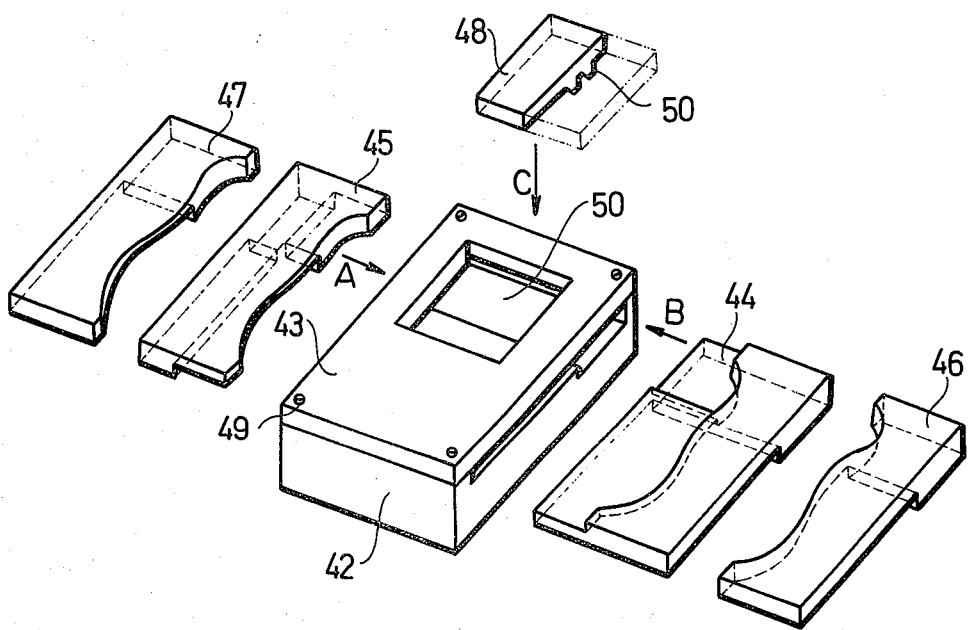
FIG. 6 represents similarly the view in perspective of an universal press tool suitable for achieving both stages.

FIG. 6 represents a press tool suitable for achieving both vulcanization stages in one and the same mould by modifying the inner space of the mould, and in a mechanical way and not by hydraulic means as in the former case.

This press tool consists of a bottom plate 42, a covering plate 43, sole insets 44, 45, 46, 47 and of a heel inset. The sole insets may be placed into the interior respectively taken out of it through the opening being in the side wall of the bottom plate and the heel inset through the opening 50 being on the upper side of the cover. The cubic capacity of the inner moulding space may be altered by the members 44–48.

The working process using the press tool in conformity with present invention comprising a mould the cubic capacity of which may be altered mechanically, is as follows:

Before putting in the crude mixture the cover 43 of the press tool is removed, the insets 44, 45 conform to the first vulcanization stage and fitting to each other and jointly constituting the moulding space, are placed on the bottom plate 42 and the heel inset 48 is placed on the cover 43. Thereafter the crude mixture is put into the press tool, the cover is placed on the bottom plate and fastened to it by the aid of the screws 49, then the press tool is placed in the press where it is pressed together at required pressure meanwhile through the heating plates the crude mixture is heated to, respectively, kept at a temperature required by the first stage of vulcanization.

On completion of the first stage of the vulcanization the cover 43 of the press tool is removed, the raising of the cover may be expediently carried out by aid of springs — not illustrated in the figure — the sole insets 44, 45 are taken out and replaced by the sole insets 46, 47 which provide a greater cubic capacity to the moulding space. The longitudinal ribs 50 of the heel insets 48 which is kept there up to the replacement of sole insets, impedes the falling out of the prevulcanized material. Thereafter the heel inset is replaced by a smaller one — not illustrated in the figure — which provides a greater cubic capacity. In the figure arrows A, B, C show the direction of the insertion of the insets.

On completion of these manipulations the form and the cubic capacity of the press tools conforms exactly to the form and dimensions of the end product. Thereafter the press tool is again closed and placed into the heatable press, where then the second stage of the vulcanization is achieved.

Both the heating and the cooling down are carried out by circulating steam respectively cold water in the channel system formed in the bottom plates respectively in the cover. By the aid of this system the intensity of heating and cooling may be increased and a fast heating up achieved at the start of the second vulcanization stage, which is of primary importance for the development of the structure and the fast filling in of the moulding space.

The press tool is suitable for producing shaped pieces of various dimensions in various forms and embossed at will by the use of properly shaped replaceable insets, in one and the same press tool, larger or smaller, right and/or left foot soles with or without embossing may be manufactured thus the press form of alterable cubic capacity may be exploited to the highest degree.

On constructing the press mould the expansion arising between the two vulcanization stages has been taken into account and the replaceable insets determine the extent of the expansion as well as the final dimensions of the finished shaped piece.

What we claim is:

1. A press mold for vulcanizing plastic materials, comprising a pair of mold parts defining between them a mold cavity, each of said mold parts having channels therethrough for the passage of a heating medium for vulcanizing the plastic material in the mold, each mold part comprising an upper plate and a lower plate, each lower plate having a plurality of said channels therein which open upwardly and are closed by the upper plate.

2. A press mold as claimed in claim 1, and packing material between said upper and lower plates of each mold part.

3. A press mold for vulcanizing plastic materials, comprising a pair of mold parts defining between them a mold cavity, each of said mold parts having channels therethrough for the passage of a heating medium for vulcanizing the plastic material in the mold, a said mold part comprising a metal plate having an outer contour that extends different distances away from the other said mold part, and insulating inserts on the outer side of said metal plate, said inserts being of such a thickness that the outer surface of the last-mentioned mold part is uniplanar.

4. A press mold as claimed in claim 3, said insulating inserts being of different thicknesses.

* * * * *